(12) United States Patent
Zweben

(10) Patent No.: US 7,028,607 B2
(45) Date of Patent: Apr. 18, 2006

(54) FROZEN FOOD MASTICATING MACHINE

(75) Inventor: Arnold P. Zweben, Palm Harbor, FL (US)

(73) Assignee: Cool Frootz, LLC, Clearwater, FL (US)

( * ) Notice: Subject to any disclaimer, the term of this patent is extended or adjusted under 35 U.S.C. 154(b) by 20 days.

(21) Appl. No.: 10/852,542

(22) Filed: May 24, 2004

(65) Prior Publication Data

US 2005/0103910 A1    May 19, 2005

Related U.S. Application Data

(60) Provisional application No. 60/523,168, filed on Nov. 18, 2003.

(51) Int. Cl.
*A23L 1/00*     (2006.01)
(52) U.S. Cl. .......................................... 99/510; 99/495
(58) Field of Classification Search ................ 426/518, 426/616, 489, 482, 481; 210/173, 174; 366/197–199, 366/205, 306, 318, 601; 241/37.5, 92, 93, 241/260.1, 282.1, 169.1; 100/117, 145–148; 99/348, 495, 509–513
See application file for complete search history.

(56) References Cited

U.S. PATENT DOCUMENTS

| 749,286 | A | * | 1/1904 | Gerner | 62/342 |
|---|---|---|---|---|---|
| 2,132,364 | A | * | 10/1938 | Thompson | 62/69 |
| 2,513,974 | A | * | 7/1950 | Thomas | 100/97 |
| 2,864,419 | A | * | 12/1958 | Woock | 99/513 |
| 3,818,716 | A | * | 6/1974 | Carpigiani | 62/178 |
| 3,976,001 | A | * | 8/1976 | Trovinger | 99/513 |
| 4,440,074 | A | * | 4/1984 | Ihara et al. | 99/510 |
| 5,246,175 | A | * | 9/1993 | Feldpausch | 241/101.8 |
| 5,396,836 | A | * | 3/1995 | Kim | 99/510 |
| 5,452,650 | A | * | 9/1995 | Lee | 99/510 |
| 5,906,154 | A | * | 5/1999 | Yoon et al. | 99/510 |
| 6,551,305 | B1 | * | 4/2003 | Ferrera et al. | 606/1 |
| 6,637,323 | B1 | * | 10/2003 | Kim | 99/510 |

* cited by examiner

*Primary Examiner*—Timothy F. Simone
(74) *Attorney, Agent, or Firm*—Dennis L. Cook, Esq.

(57) ABSTRACT

A device for masticating frozen foodstuffs such device having a housing; a motor installed inside the housing; and an inlet portion for introducing foodstuffs therein connected to a masticating chamber. A plunging device is attached such that a piston is inserted into the inlet hopper to move the frozen foodstuffs into the masticating chamber. A masticating element is contained within the masticating chamber and is connected to the motor. This masticating element is formed with a threaded masticating portion with a plurality of cutting grooves having ninety degree angles of attack for masticating the frozen foodstuffs into the desired creamy texture. The masticating element also has a transferring portion with a plurality of moving shoots to move the masticated product out of the machine. The frozen fruits, vegetables, or other foodstuffs are easily loaded, masticated, and cleanly removed from the apparatus. When using frozen fruits this results in a non-dairy frozen dessert comprised of quick frozen fruit composite which has been masticated to achieve a desired creamy texture. Fruit, vegetables, or other frozen foodstuffs may be used alone or in combination with other flavoring agents such as vanilla extract, oils such as mint and powders or liquors such as chocolate and carob.

8 Claims, 6 Drawing Sheets

| Trial Number | Machine Type | Fruit/Blend | Est. Density g/cc | % Overrun |
|---|---|---|---|---|
| Trial 1 | Disclosed apparatus | Banana | N/A | -4.48% |
| Trial 2 | Disclosed apparatus | Banana | 0.9594 | -0.73% |
| Trial 3 | Disclosed apparatus | Banana/Strawberry | 0.7438 | 0.57% |
| Trial 4 | Disclosed apparatus | Papaya | 1.4980 | -1.04% |
| Trial 5 | Disclosed apparatus | Mango | 1.1418 | -1.64% |
| Trial 6 | Disclosed apparatus | Mango | 0.8303 | -1.32% |
| Trial 7 | Disclosed apparatus | Mango, Banana, Pineapple | 1.0092 | -1.29% |

FROZEN FOOD MASTICATING MACHINE

CROSS-REFERENCE TO RELATED APPLICATION

The present application claims the benefit of previously filed co-pending Provisional Patent Application Ser. No. 60/523,168 filed Nov. 18, 2003.

BACKGROUND OF THE INVENTION

People are becoming increasingly preoccupied with the effects of diet on their health and overall wellbeing. For this reason, a growing number of Americans seek to reduce their intake of preservatives and food additives, reduce their consumption of fats and cholesterol, and lower their intake of processed sugar. In addition, a growing segment of the population needs to exclude all dairy products from their diet due to allergy. For all of the aforementioned people there is a need for a machine that can produce healthful desserts and frozen foods that will allow them to exclude the above named non-desired food ingredients from their diets.

Various devices have been suggested over the years for forming frozen products, such as dessert products like ice cream. An ice cream freezer is disclosed in U.S. Pat. No. 749,286 to Gerner. Such an apparatus is quite complex as the can itself is rotated during the food making process. In. U.S. Pat. No. 2,132,364 to Thompson, an apparatus is disclosed for forming ice cream wherein air is introduced to create an overrun. Such an apparatus is quite complex and a liquid mix is fed into the air cylinder. In U.S. Pat. No. 2,864,419 to Woock and U.S. Pat. No. 3,976,001 to Trovlager, conventional juicers are disclosed. In Thomas, U.S. Pat. No. 2,513,974, a juice extractor is disclosed in which the ground-up food is merely fed by gravity to the operating cylinder, not pushed as may be necessary with masticated solids. In Carpigiani, U.S. Pat. No. 3,818,716, an ice cream machine is disclosed where the food material is frozen in a cylinder and not thereafter masticated. In Feldpausch, U.S. Pat. No. 5,246,175 an apparatus for making frozen foods including a mastication cylinder, a frozen food material feeder leading into the mastication cylinder, a masticator disposed in the cylinder and an aeration cylinder for introducing air into masticated frozen food fed into the aeration cylinder is disclosed.

None of these patents disclose a simple to use machine that produces pure masticated frozen foodstuffs with a creamy texture with no air or other ingredients added.

Therefore, there is a need for an apparatus for forming such frozen foodstuffs. Such an apparatus should be simple to use, economical and relatively easy to manufacture.

It is an object therefore of this invention to provide an apparatus that creates a creamy textured frozen food product that utilizes as its only ingredient frozen fruits, vegetables, or other foodstuffs.

It is another object of this invention to provide an apparatus to produce a frozen dessert that can be made without the addition of food additives and preservatives.

It is yet another object to provide a frozen dessert that can be made substantially fat free.

This and other objects of the invention will in part be obvious and will in part appear hereinafter.

The invention accordingly comprises the apparatus and product possessing the features, properties and the relation of components and the process involving the several steps in relation and order of one or more of such steps with respect each of the others all of which are exemplified in the following detailed disclosure and the scope of the application of which will be indicated in the claims.

For a fuller understanding of the nature and objects of the invention reference should be made to the following detailed description taken in conjunction with the accompanying drawings.

BRIEF DESCRIPTION OF THE FIGURES

FIG. 2 is a front view of the apparatus in accordance with the teachings of the invention;

SUMMARY OF THE INVENTION

Figure 1:
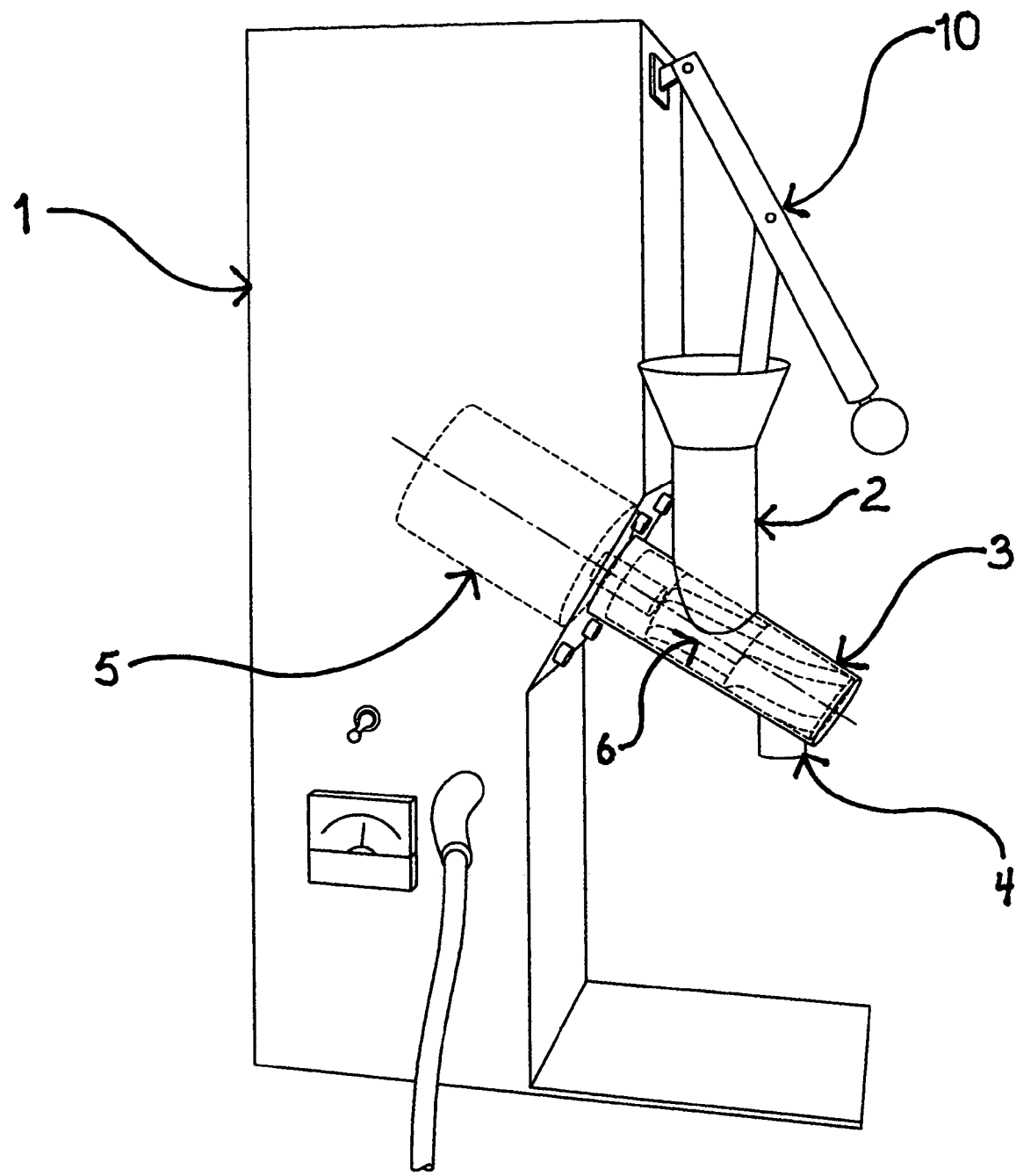
FIG. 1 is a side view of the apparatus in accordance with the teachings of the invention.

A device for masticating frozen foodstuffs is disclosed. The device has a housing; a motor installed inside the housing; and an inlet hopper portion for introducing foodstuffs therein connected to the masticating chamber. A plunging device is attached such that a piston is inserted into the inlet portion to move the frozen foodstuffs into the masticating chamber. A masticating element is contained within the masticating chamber and is connected to the motor. This masticating element is formed with a masticating portion containing a plurality of masticating threads and unique cutting grooves for masticating the frozen foodstuffs into the desired creamy texture. The masticating element also has a transferring portion with moving shoots to move the masticated product out of the machine through the product delivery spout. The frozen fruits, vegetables, spices, or other foodstuffs are easily loaded, masticated, and cleanly removed from the apparatus. When using frozen fruits this results in a non-dairy frozen dessert comprised of quick frozen fruit composite which has been masticated to achieve a desired creamy texture. Fruit, vegetables, or other frozen foodstuffs may be used alone or in combination with other flavoring agents such as spices, vanilla extract, oils such as mint and powders or liquors such as chocolate and carob.

DESCRIPTION OF THE PREFERRED EMBODIMENT

The present invention relates to an apparatus to create a frozen confection which has properties such as taste and mouth feel similar to soft serve ice cream.

The invention differs from all of the products which start with a liquid which is a mixture of some or all of the following; dairy products, water, fruit concentrates, sugar, emulsifiers, stabilizers, colors, and fats derived from vegetable, and/or animal sources. Typically the liquid is cooled and frozen while being whipped. The whipping action is what gives the products its overrun which is the entrainment of air therein. The percent of overrun is an expression of the amount of air that is frozen in said dessert. This entrainment of air is what usually gives the whipped frozen foodstuffs its creamy texture. This apparatus creates the creamy texture desired without any addition of emulsifiers and the like and without any overrun.

Most machines of this nature have been designed to separate, crush or extract. In the apparatus disclosed in this application whatever goes into the apparatus is ground so fine that no traces of small seeds or fiber are visible. All combinations of fruit or vegetables are completely mixed to create new flavors and taste stimulation. This is done while the foodstuffs are still frozen so there is no need for an additional refrigerating means within the apparatus. Dairy products are not needed for body or flavor. The finished product holds its shape long after thawing occurs. The masticating chamber and masticating element described below are designed to move a complete product with minimal waste of product hung up in the masticating chamber or on the masticating element.

This apparatus also is self-cleaning, with no need to disassemble the machine to clean the masticating element or masticating chamber. This is, of course, a significant safety feature because the masticating element is never exposed. Although not shown in the drawings those skilled in the art could easily add a water spray attachment to spray cleaning water through the hopper in into the masticating chamber to further facilitate the ease of cleaning. The masticating element is self-cleaning because the cutting grooves on the masticating portion of the masticating element releases product as it is used. This is possible because in the preferred embodiment the angle of attack of the cutting grooves is approximately 90 degrees. This allows the foodstuff to have a longitudinal movement towards the product delivery spout of the masticating chamber. Too great of a forward rake in the cutting grooves would trap foodstuffs and cause clogging, thus preventing a natural flow of product to the exit hole. To large of a backward rake would throw product perpendicular to the desired direction of product flow. In the preferred embodiment of the invention a semi-cylindrical shaped cutting groove is used although other shapes could be used as long as the angle of attack is 90 plus or minus 20 degrees.

Because of the need to not generate too much heat during the mastication process the number of cuts per revolution is key to the successful operation of the apparatus. The frozen food product is cut up to 8 more times per revolution than conventional crushing and juicing machines when operating. This is achieved by maintaining a low motor RPM, approximately 1,500 to 2,000 RPM, but having the masticating threads placed on the masticating portion of the masticating element in a threaded configuration. The preferred embodiment of the invention uses a fixed speed motor that operates at a speed of 1750 RPM but variable speed motors could be used as is well known by those skilled in the art. By using threaded style masticating threads a bonus is achieved. The threads also help to move the product along towards the product delivery spout. Frozen product has no natural flow and tends to bond with a surface of lesser temperature and thus the threaded nature of the masticating threads overcomes this problem. Also located on the masticating portion of the masticating element are the cutting grooves. These cutting grooves are longitudinally aligned grooves in parallel with the axis of rotation of the masticating element. They are semi-cylindrical in shape, and have a forward angle of attack, or cutting surface in the preferred embodiment, of 90 degrees to the inside of the masticating chamber when viewed against the rotational direction of the masticating element.

The frozen foodstuffs stay in the masticating portion of the masticating element described above long enough for a complete mastication. After it is ground it then needs to be mixed completely and moved out of the masticating chamber so a transferring portion is located on the masticating element after the foodstuffs pass the masticating portion. This transferring portion of the masticating element has multiple moving shoots trailing from the direction of rotation at a variable angle in order to create the pressure required to force the product out the product delivery spout of the masticating chamber. Variations of moving shoot angles in transferring portion of the masticating element create varying results in terms of mixing and exiting the foodstuff, all of which are considered disclosed by this application. If the angle is too great too much back pressure would develop and blow out could occur. If the angle is too little there is not enough pressure to force a frozen foodstuff out the product delivery spout.

The downward slope of the product delivery spout also creates enough pressure to uniform the product. This slope and shape also inhibits entry of inquisitive fingers. The angle of the product delivery spout provides a clean flow of product without collection of waste and provides for easy cleaning without removal of the masticating element. If the masticating chamber were at a 90 degree angle, as is commonly used, the spinning motion of the masticating element would sling the product out of the inlet hopper. With the down-sloped angle of the masticating chamber the product is thrown against the front wall of the inlet hopper and pushed back into the masticating chamber by the piston. In the preferred embodiment triangular shaped threads are used in the masticating and transferring portions of the masticating element because the triangle shaped threads results in the longest cutting edge when product travel and no clogging is desired, but those skilled in the art will envision other thread shapes, all of which are considered included in this disclosure. It should be recognized that additional rotational speed would also increase travel speed, but additional speed creates heat and would not preserve the original temperature of the frozen foodstuffs, which is an important part of this invention since no additional refrigeration is required to produce the creamy textured frozen product.

Figure 2:
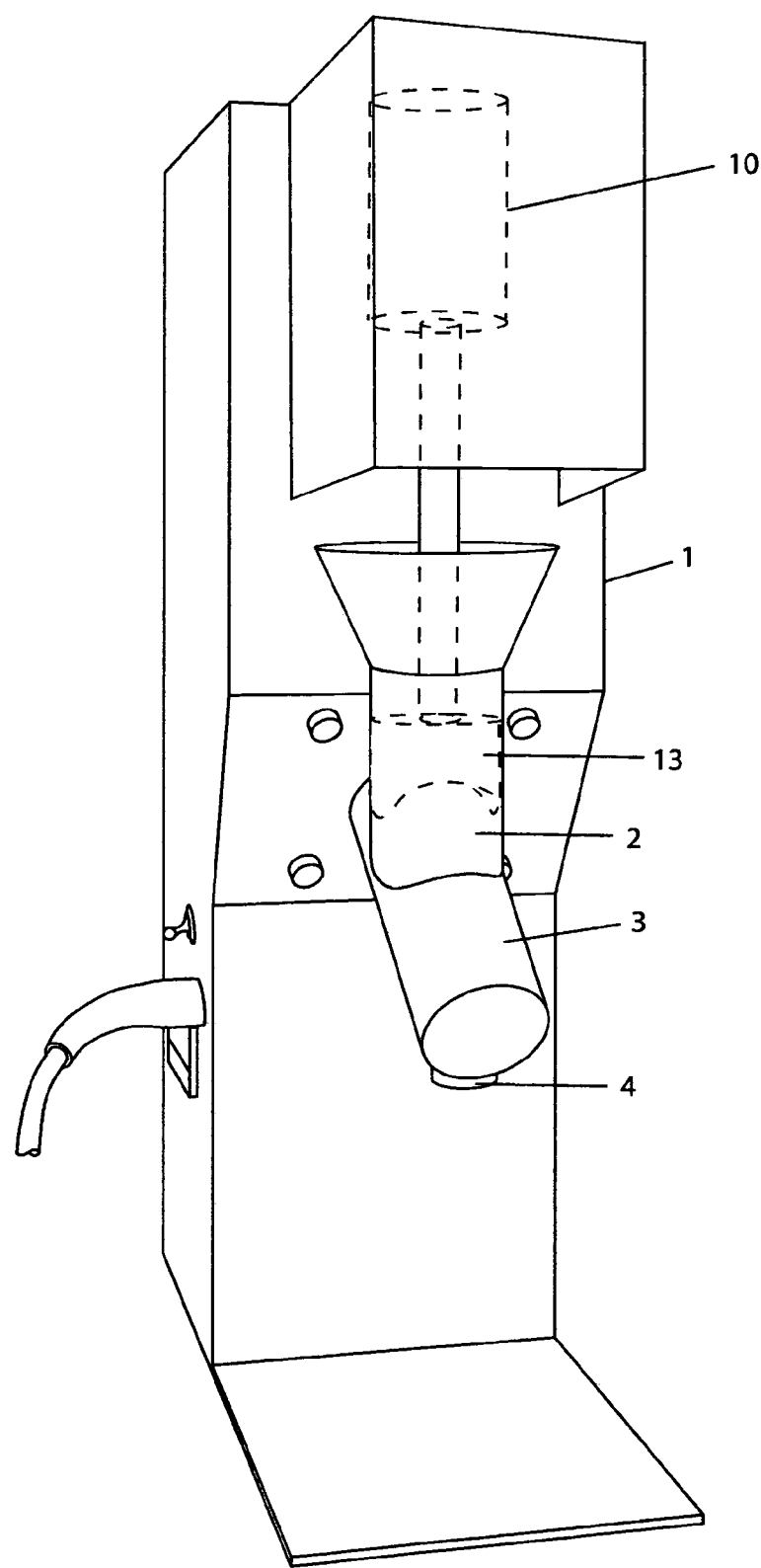
FIG. 2 is a front view of an alternative embodiment of the apparatus in accordance with the teachings of the invention.

Referring now to FIGS. 1 and 2, the reader can readily see that the apparatus has a housing (1) with a motor (5) installed inside the housing (1) to turn the masticating element (6). An inlet hopper (2) for introducing foodstuffs therein is connected to the masticating chamber (3) at a greater than 90 degree angle such that the foodstuffs easily flow out of the masticating chamber (3). A plunger mechanism (10) is rotatably attached to the housing (1) such that a piston (13) is inserted into the inlet hopper (2) and the plunger mechanism (10) can be rotated such that it easily moves the piston through the inlet hopper (2) towards the masticating chamber (3) to move the frozen foodstuffs into the masticating chamber (3) with sufficient pressure to hold the frozen foodstuffs against the masticating element (6). The piston (13) has a cylindrically shaped portion that is conformably fitted to said masticating element on the end approaching the masticating element when said plunging mechanism (10) is operated and the piston (13) presses the frozen foodstuffs into the masticating chamber (3) against the masticating element (6). Alternatively, as shown in FIG. 2, the plunger mechanism (10) could be an actuator or other mechanical movement device that is electrically or hydraulically operated using methods well known to those skilled in the art.

Figure 3:
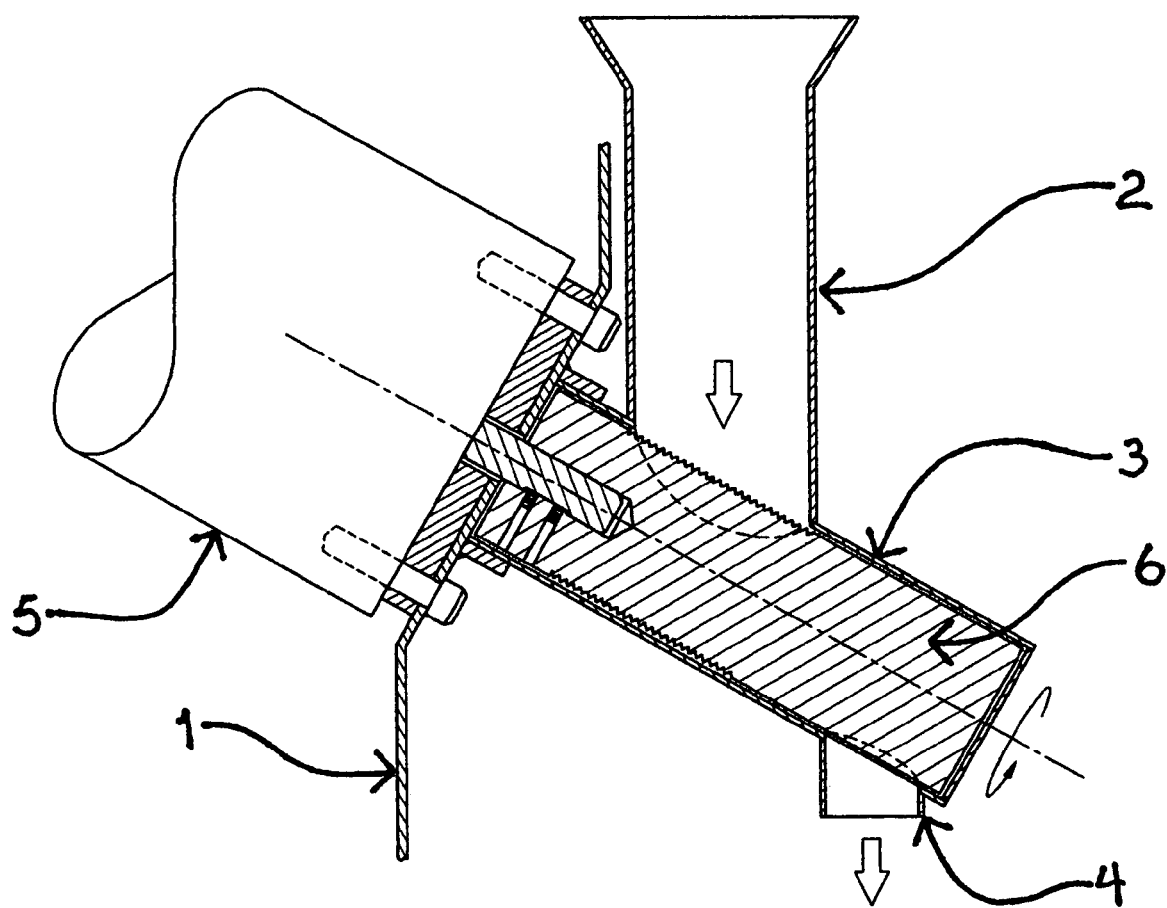
FIG. 3 is a cut away side view of the inlet hopper, mastication chamber, and product delivery spout.
Figure 4:
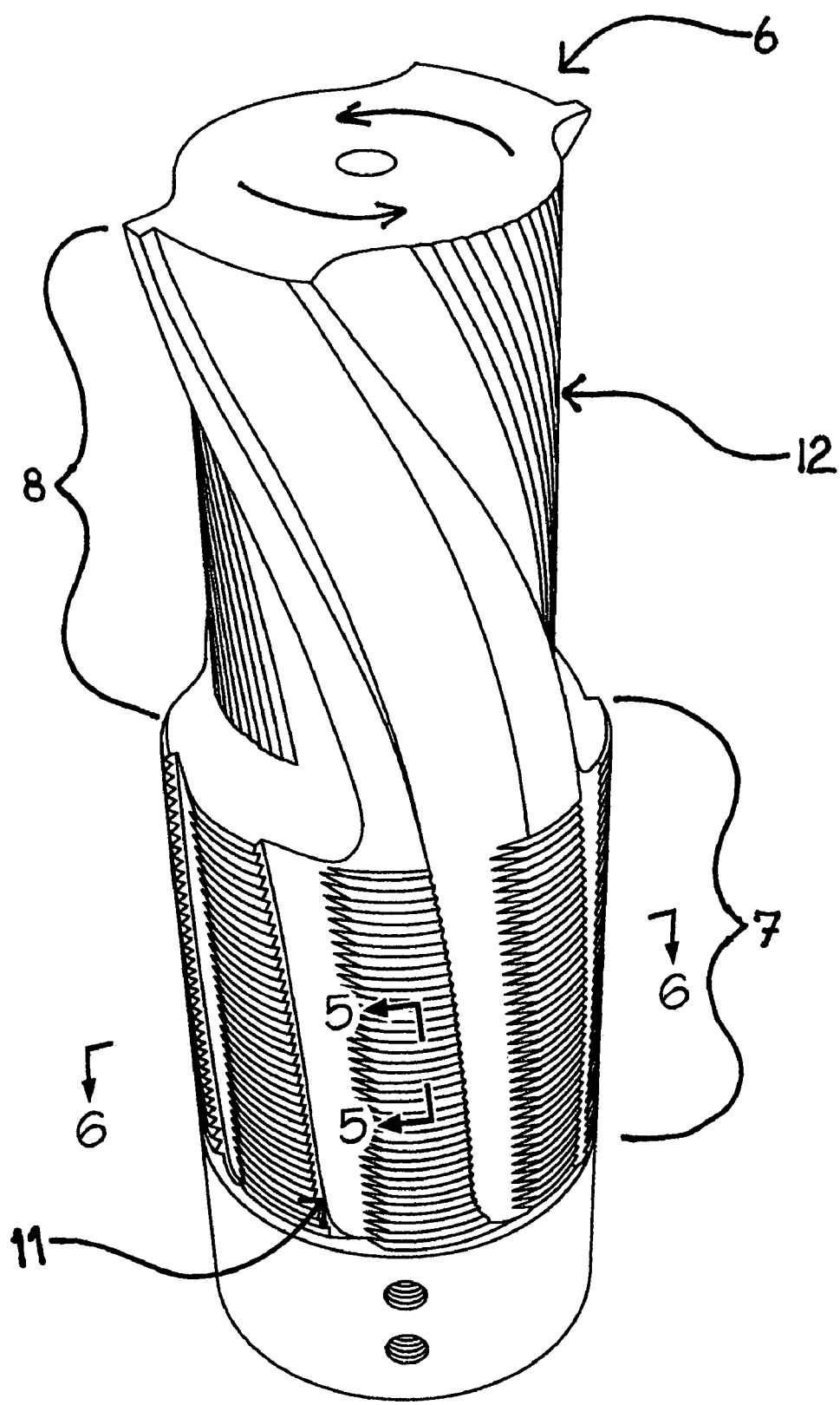
FIG. 4 is a view of the masticating element.
Figure 5:
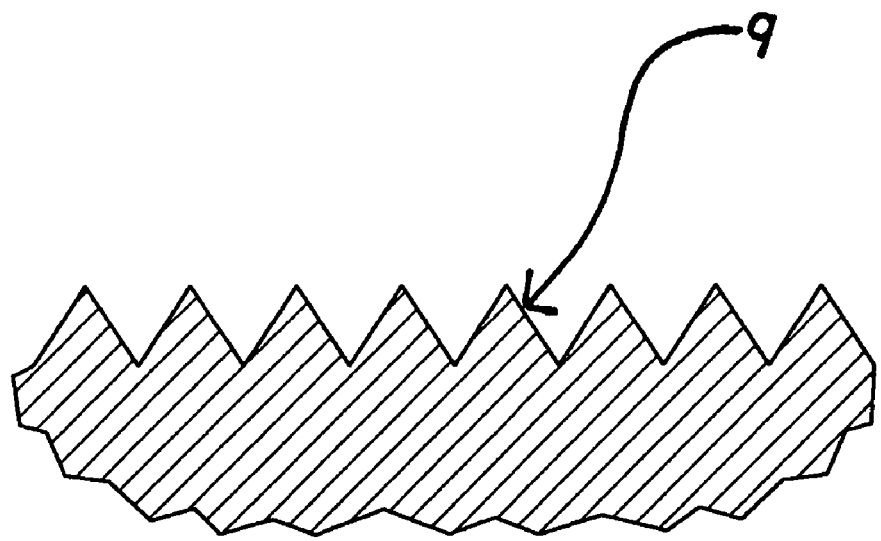
FIG. 5 is a cut away view of the masticating element showing the masticating threads on the masticating portion of the masticating element.
Figure 6:
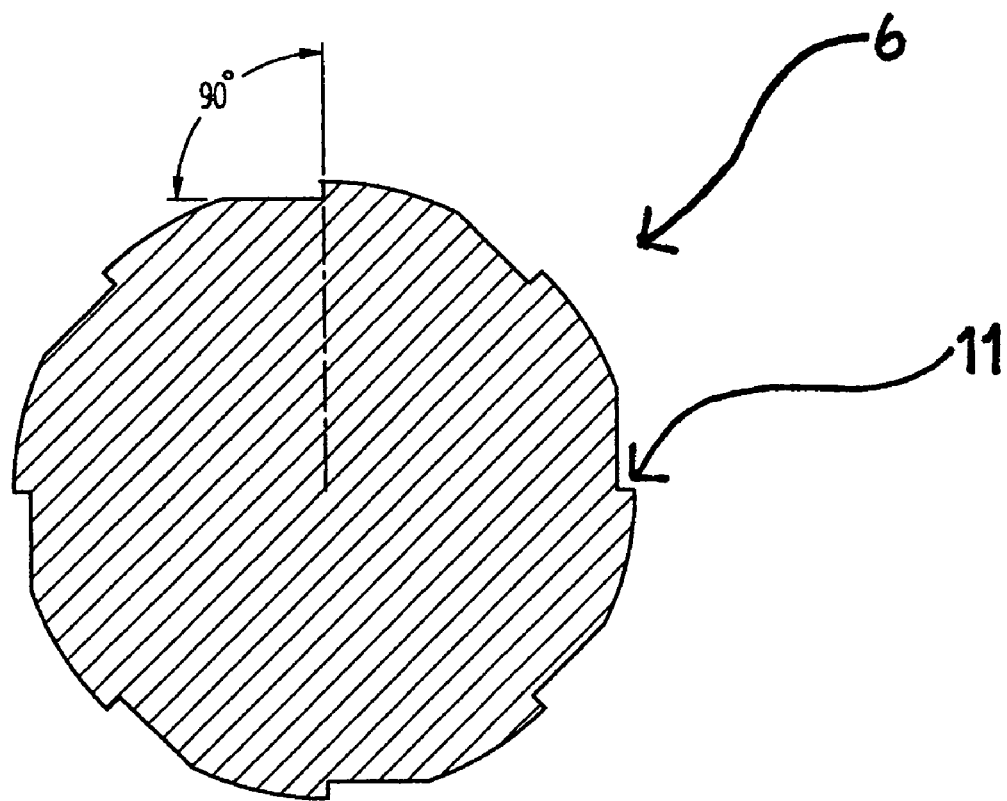
FIG. 6 is a cut away view of the masticating element showing the attack profile of the cutting grooves on the masticating portion of the masticating element.

As disclosed in FIG. 3 the internal masticating element (6) is contained within the masticating chamber (3). In the preferred embodiment the tolerance between the masticating element (6) and the masticating chamber (3) is approximately 0.0060 inches. The masticating element (6) is directly connected to the motor (5) in the preferred embodiment but could be coupled to the motor (5) through gears, disconnects, and braking mechanisms (not shown) well known to those skilled in the art. The masticating element (6) could also be attached at the distal end of the masticating chamber (3) using a rotating axle and bearing mechanism (not shown) in order to add additional strength to the complete masticating structure as is well known to those skilled in the art. This internal masticating element (6) is formed with a masticating portion (7) having a, a plurality of threads (9) and a plurality of cutting grooves (11), as disclosed in FIGS. 4, 5, and 6 for masticating the frozen foodstuffs into the desired creamy texture. The cutting grooves (11) are semi-cylindrical in shape and form a 90+/−20 degree angle of attack against the inside surface of the masticating chamber (3) when the masticating element (6) is rotating. The masticating element (6) also has a transferring portion (8) with moving shoots (12) as described above to move the masticated product out of the machine. The frozen fruits, vegetables, or other foodstuffs are easily loaded, masticated, and cleanly removed from the apparatus. When using frozen fruits this results in a non-dairy frozen dessert comprised of quick frozen fruit composite which has been masticated to achieve a desired creamy texture. The creamy texture is unique because it is the result of the sheering nature of the masticating element and not from added emulsifiers or overrun as shown in the test described below. Fruit, vegetables, or other frozen foodstuffs may be used alone or in combination with other flavoring agents such as vanilla extract, oils such as mint and powders or liquors such as chocolate and carob.

The purpose of the tests was to determine % overrun or % entrapped air in the frozen material product. The following is a description of the procedure and results.

In order to test for entrapped air when dealing with viscous materials, the use of a diluent is employed in order to thin the viscous material to thereby release any entrapped air. That is, by adding a diluent to an air overrun material, the final volume would be less the sum of the two volumes. The procedure for this test is further shown in FIG. 7. Therefore, if can be shown:

Overrun % (% volume)=$(V_i+V_d/V)-1$

1. Seven Frozen fruit products, some of which were purchased "instantly quick frozen" or IQF, and blends thereof were selected for testing on apparatus.
2. A known weight of frozen fruit or fruit blend was fed into the apparatus, processed into the frozen material, and collected in a volumetric container (Graduated cylinder or graduated beaker).
3. The frozen material was weighed and then gently pushed down to remove any large air pockets caused by the viscous material folding path into the container.
4. A known volume and weight of deionized water diluent was then added to the frozen material.
5. The resultant volume was then observed.

Figures 7, 8:
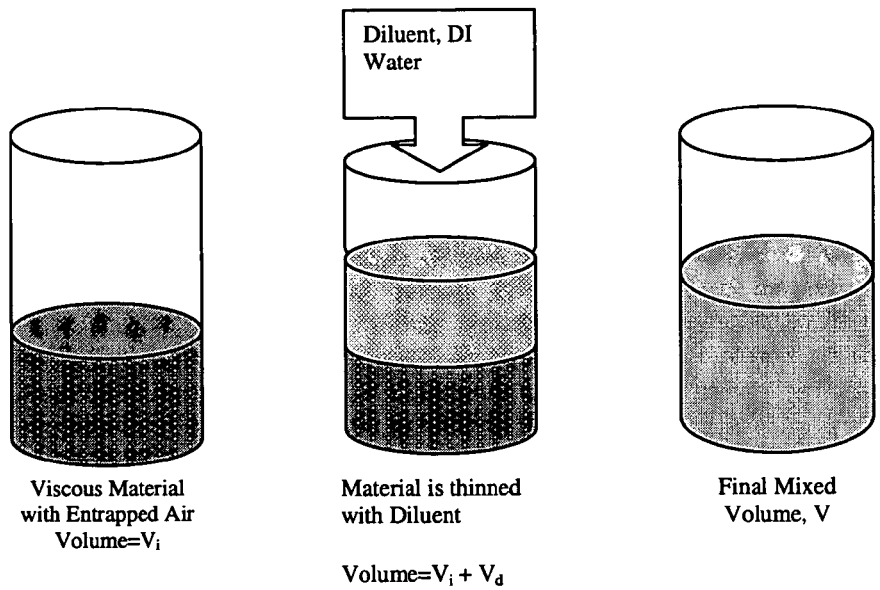
FIG. 7 is a depiction of the test procedure
FIG. 8 is a chart showing the resultant densities and overrun of the tested material.

The results of this test is shown in the chart disclosed in FIG. 8. Density data was interpreted as follows: Density (g/cc)=weight of material/volume in cc.

It can be seen that was is disclosed is an apparatus for making frozen foodstuffs with a creamy texture without any added air, dairy products, or other texture enhancing materials. The apparatus is simple and easy to operate and self-cleaning. Although a specific embodiment of the invention has been disclosed, variations thereof may occur to an artisan and the scope of the invention is only to be limited by the scope of the appended claims.

What is claimed is:

1. A device for masticating frozen foodstuffs resulting in a non-dairy frozen material comprised of frozen composite which has been masticated to achieve a creamy texture comprising:
   a) a housing;
   b) a motor installed inside said housing;
   c) a masticating chamber having a cylindrically shaped inside surface, a upper portion, a lower portion, a front end, and a back end;
   d) an inlet hopper portion for introducing foodstuffs into said masticating chamber attached at an angle greater than ninety degrees to said masticating chamber on said masticating chamber's upper portion in proximity with said masticating chamber's back end;
   e) a product delivery spout for delivering the masticated frozen foodstuffs attached at an angle less than ninety degrees to said masticating chamber on said masticating chamber's lower portion in proximity with said masticating chambers front end;
   f) a plunger mechanism with a piston connected at one end and movably attached to said housing such that said piston, when inserted into said inlet hopper after frozen foodstuffs are inserted into said inlet hopper, is capable of pushing the frozen foodstuffs into said masticating chamber;
   g) a masticating element having a cylindrical shape fittingly contained within said masticating chamber and connected to said motor such that said masticating element is capable of rotating around said masticating elements cylindrical axis inside such masticating chamber when said motor is activated;
   h) said masticating element having a masticating portion having a threaded surface and a plurality of cutting grooves parallel to said masticating element's axis of rotation for masticating the frozen foodstuffs;
   i) said cutting grooves upper cutting edges forming 70 to 110 degree cutting angles with the inside surface of said masticating chamber and said threaded surface configured such that the frozen foodstuffs are masticated and moved towards the front end of said masticating chamber when said masticating element is rotating; and,
   j) said masticating element also having a front end formed with a transferring portion with multiple moving shoots to move the masticated frozen foodstuffs towards the front end of said masticating chamber and out of said masticating chamber through said product delivery spout.

2. The device of claim 1 wherein said motor rotates said masticating element inside said masticating chamber at a rate of approximately 1,500 RPM to 2,000 RPM.

3. The device of claim 2 wherein said motor rotates said masticating element inside said masticating chamber at a rate of 1,750 RPM.

4. The device of claim 1 wherein said motor is a variable speed motor.

5. The device of claim 1 wherein said masticating element's transferring portion is further formed with a variable angle trailing from the direction of rotation of said masticating element such that such rotation creates pressure to force the masticated frozen foodstuffs out of said product delivery spout.

6. The device of claim 1 wherein said plunger mechanism is electrically operated.

7. The device of claim 1 wherein said plunger mechanism is hydraulically operated.

8. The device of claim 1 wherein said piston has a cylindrically shaped portion that is conformably fitted to said masticating element on the end approaching said masticating element when said plunger mechanism is operated.

* * * * *